United States Patent [19]

Hendriks et al.

[11] Patent Number: 5,424,888
[45] Date of Patent: Jun. 13, 1995

[54] SPEED INDEPENDENT, AIR BEARING SLIDER

[75] Inventors: Ferdinand Hendriks, Yorktown Heights; Vijayeshwar D. Khanna, Ossining, both of N.Y.; Robert M. Crone, Rochester, Minn.

[73] Assignee: International Business Machines Corp., Yorktown Heights, N.Y.

[21] Appl. No.: 82,210

[22] Filed: Jun. 24, 1993

[51] Int. Cl.[6] ............................... G11B 5/60
[52] U.S. Cl. ..................................... 360/103
[58] Field of Search ............... 360/103, 102, 122, 104

[56] References Cited

U.S. PATENT DOCUMENTS

| | | | |
|---|---|---|---|
| 3,197,751 | 7/1965 | Felts | 340/174.1 |
| 3,573,768 | 4/1971 | Harris | 340/174.1 |
| 4,218,715 | 8/1980 | Garnier | 360/103 |
| 4,605,977 | 8/1986 | Matthews | 360/103 |
| 4,692,821 | 9/1987 | Zenzefilis | 360/78 |
| 4,802,042 | 1/1989 | Strom | 360/103 |
| 4,870,519 | 9/1989 | White | 360/103 |
| 4,893,204 | 1/1990 | Yamada et al. | 360/103 |
| 4,894,740 | 1/1990 | Chhabra et al. | 360/103 |
| 4,939,603 | 7/1990 | Inumochi | 360/103 |
| 4,984,114 | 1/1991 | Takeuchi et al. | 360/103 |
| 5,021,906 | 6/1991 | Chang et al. | 360/103 |
| 5,267,108 | 11/1993 | Tani | 360/103 |

OTHER PUBLICATIONS

IEEE Transactions on Magnetics, vol. 25, No. 5, Sep., 1989-pp. 3713-3715 An Air Bearing Minimizing the Effects of Slide Skew Angle-Clifford/Henze-Hewlett Packard Labs.
Research Disclosure, Jan., 1991, No. 321-91A060236 Balster, Carlson & Harwood-Magnetic Head with Arrow-Shaped Air Bearing Surface.
Tribology & Mechanics of Magnetic Storage Systems, vol. III-ASLE Special Publication SP-21 pp. 95-10-1-An Air Bearing Slider w/Uniform Flying Height & Fast Take-Off Characteristics-J. W. White.

Primary Examiner—Robert S. Tupper
Assistant Examiner—William R. Korzuch
Attorney, Agent, or Firm—Perman & Green

[57] ABSTRACT

An air bearing slider has both front and rear pads extending from a generally planar body, both pads having faces opposed to a recording medium and separated by a gap that is substantially in excess of any fly height of the slider. Both surfaces exhibit extremely small taper angles that enable "inlet throttling" of air beneath the slider. Such inlet throttling provides the slider with a fly height that is substantially independent of relative speed changes between the slider and a recording medium. A preferred embodiment includes front and rear pads that are convex in, the direction of movement of the recording medium e.g. are "forward swept". Such convexity enables substantial resistance to fly height changes in response to skew alteration.

36 Claims, 7 Drawing Sheets

SPEED INDEPENDENT, AIR BEARING SLIDER

FIELD OF THE INVENTION

This invention relates generally to magnetic head, gas bearing slider assemblies, and more particularly, to an air bearing slider assembly that exhibits a fly height that is substantially independent of speed variations of the recording media.

BACKGROUND OF THE ART

Over more than three decades, various gas bearing slider designs (e.g. air bearing sliders) have been created in an attempt to solve the problem of fly height variations. While there is no generally agreed upon single "figure of merit" for an air bearing slider, it is undeniable that it should, at least, have the following qualities: low stiction; low take-off and landing speeds; a low sensitivity of fly height to skew angle variations (i.e. angle between the central axis of the slider and the axis of movement of the recording media); and a low sensitivity of fly height to disk speed variations and to manufacturing errors, such as crown (a non-planarity of the slider). For magnetic recording purposes, constancy of recording gap is important, even in the presence of disturbing mechanical excitations, e.g., disk roughness, spindle run-out, aerodynamic buffeting, etc.

The prior art evidences a number of techniques for attempting to overcome the aforementioned effects and disturbances. U.S. Pat. No. 3,197,751 to Felts shows a flying magnetic head assembly wherein a generally planar slider has a recording head mounted behind its lagging edge. The recording head is positioned so that it penetrates an air film over the disk and maintains that position irrespective of moderate variations of angle of attack between the slider and the disk surface. The leading edge of the slider is rounded or beveled to provide a "ski nose" to enable air to be compressed beneath the slider.

U.S. Pat. No. 3,573,768 to Harris illustrates an air bearing slider that includes a pair of stepped regions, one upstream from another. The two level steps enable a low stiction line contact between the slider body arid the recording surface when the recording surface is at rest. Further, as a result of the height difference between the steps, no taper is required of the step surfaces. The distance between the front and rear steps is indicated as being approximately equal to the desired flying height of the slider. Harris states that this distance should be approximately 50 microinches.

Chang et al. in U.S. Pat. No. 5,021,906 disclose a programmable air bearing slider which includes the separated front and rear air bearing surfaces, separated by a central non-air bearing region. The central region is recessed and includes a piezoelectric element that is capable of deforming the slider. The front air bearing surface includes a tapered leading portion (approximately 10 milliradians) and the rear air bearing surface has no taper angle. By appropriate control of the piezoelectric element, a curvature is induced in the central region thereby lowering the fly height of a head attached to the rearmost portion of the slider.

Matthews in U.S. Pat. No. 4,605,977 discloses another version of an active-control air bearing slider. In this instance, however, Matthews employs a railed slider with a piezoelectric element that enables a lead taper angle of the slider to be adjusted to achieve a desired flying height.

A widely used air bearing slider configuration includes a body with a pair of rails that are oriented parallel to the direction of movement of the recording surface. The aerodynamics of a railed slider make its fly height particularly susceptible to skew angle variations. With the popularity of rotary arm actuators, much attention has been given to reducing the effects of skew on railed sliders. Railed sliders also exhibit strong, so-called side leakage of air from beneath the rails. As side leakage varies with disk speed, undesirable variations in fly height of the slider occur as disk speeds vary from inner to outer disk tracks. Furthermore, railed sliders generally exhibit large front taper angles that control the slider's speed dependence.

In U.S. Pat. No. 4,870,519 to White, a railed air bearing slider assembly is described wherein each rail has a tapered forward end to provide a converging inlet to achieve a fluid air film beneath the rails. Additionally, each rail has at least one longitudinal angled contour to compensate for skew. Additional description of the structure described by White can be found in "An Air Bearing Slider With Uniform Flying Height and Fast Take-Off Characteristics", Tribology and Mechanics of Magnetic Storage Systems, Volume III, ASLE Special Publication SP-21, American Society of Lubrication Engineers, Park Ridge Ill. pages 95–101.

Clifford et al in "An Air Bearing Minimizing the Effects of Slider Skew Angle", IEEE Transactions on Magnetics, Volume 25, September 1989, pages 3713–3715, describe a further technique for reducing skew effects in a railed slider assembly. Clifford et al suggests the use of transverse slots across both rails which function as pressure relief areas to enable achievement of a more uniform fly height. Other pressure relief structures in railed air bearing sliders can be found in U.S. Pat. No. 4,802,042 to Strom.

Other shaped air bearing sliders that employ rails may be found in "Magnetic Head With Aero-Shaped Air Bearing Surface" by Balster et al., Research Disclosure, Jan. 19, 1991, number 321; U.S. Pat. Nos. 4,984,114 to Takeuchi et al; 4,218,715 to Garnier; and 4,984,740 to Chhabra et al.

While the prior art describes how various slider configurations can be designed to cope with the problems of skew, it generally does not address the question of minimizing speed and skew dependence, individually. Typically, prior art sliders have taper angles of 10 milliradians or larger. At such large taper angles, a slider's aerodynamic lift decreases with increasing taper angle (i.e. in aeronautical parlance, a "stall" regime). The tapers of most prior art sliders operate in the stall regime in that they employ a large taper angle. The primary reason is for manufacturing ease in that it is easier to assure that the intersection formed by the juncture of slider's taper and flat regions ends up at the correct location when the taper angle is large. However, a cost of such a high taper angle is that in the stall regime, lift becomes highly speed dependent, even at normal operating speeds.

A further problem with a large taper angle is that at medium and high disk speeds, air is regurgitated from the taper region. As a result, a sliders' taper regions are exposed to relatively large amounts of contaminated air which never enter the flat rail sections of the slider. This may cause debris accretion in the taper area that contributes to head crashes since it modifies the shape of the air bearing in the crucial entry region.

Accordingly, it is an object of this invention to provide an improved air bearing slider for magnetic recording.

It is another object of this invention to provide an improved air bearing slider that avoids the problem of regurgitated air from the slider's taper region.

It is yet another object of this invention to provide an improved air bearing slider that is manufacturable through the use of planar processes.

It is yet another object of this invention to provide an improved air bearing slider structure which exhibits low stiction, low take-off and landing speeds, a fly height that is substantially insensitive to skew and disk speed variations, and a substantial insensitivity to slider crown variations.

SUMMARY OF THE INVENTION

An air bearing slider has both front and rear pads extending from a generally planar body, both pads having faces opposed to a recording medium and separated by a gap that is substantially in excess of any fly height of the slider. The separation enables the slider to exhibit good pitch stability. Both surfaces exhibit extremely small taper angles that enable "inlet throttling" of air entrained by the slider. Such inlet throttling provides the slider with a fly height that is substantially independent of relative speed changes between the slider and a recording medium. A preferred embodiment includes front and rear pad platform shapes that are convex in the direction of movement of the recording medium. Such convexity enables substantial resistance to fly height changes in response to skew variations due to head access motion.

DETAILED DESCRIPTION OF THE INVENTION

A principal finding of this invention is that an air bearing slider having pads with extremely small taper angles exhibits fly heights that are substantially independent of disk speed. Such small taper angles create an "inlet throttle" effect on ingested air between a pad's bearing surface and the surface of a moving disk. The inlet throttling effect restricts to a constant the amount of ingested air beneath a pad's surface, thereby enabling a relatively constant fly height, irrespective of variable disk speeds. The throttling effect or metering of air flow entrained by the slider is promoted by a thin, sharp, pad leading edge.

Figure 1:
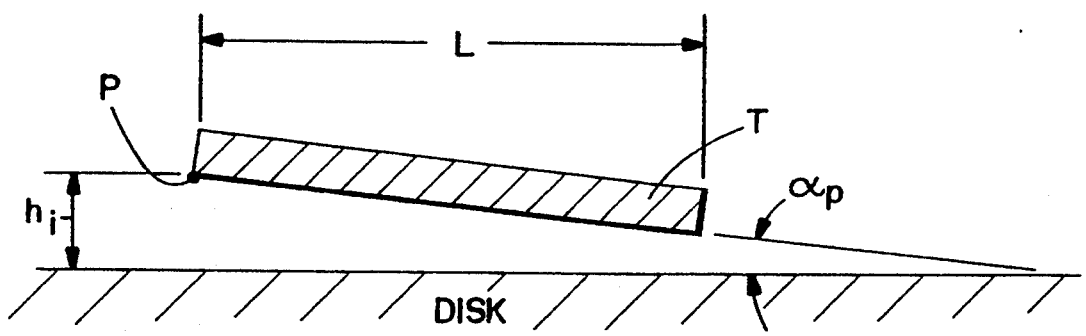
FIG. 1 is a side sectional view of an air bearing slider pad that is tilted in relation to a disk surface.

Prior to discussing specific examples of air bearing sliders that exhibit inlet throttle characteristics, the conceptual details of inlet throttling will be presented. As shown in FIG. 1, a planar, tilted pad T of an air bearing slider is positioned over a disk that moves at a speed U. An air inlet point P is defined by a leftmost point on the leading edge of tilted pad T. Point P is a distance $h_i$ above the disk, with $h_i$ defined as the inlet gap for entrained air. Tilted pad T is oriented at an angle $\alpha_p$ which is the pad taper angle relative to the disk. Pad T has a length L in the general direction of disk motion and a width W (not shown) that is normal to the paper plane of FIG. 1. So long as width W is not much smaller than L, it can be shown that inlet throttling can be achieved through the use of a small taper angle. If, as is commonly the case, W is much less than L, the pad becomes a "rail-like" and inlet throttling effects are lost by side leakage.

Figure 2:
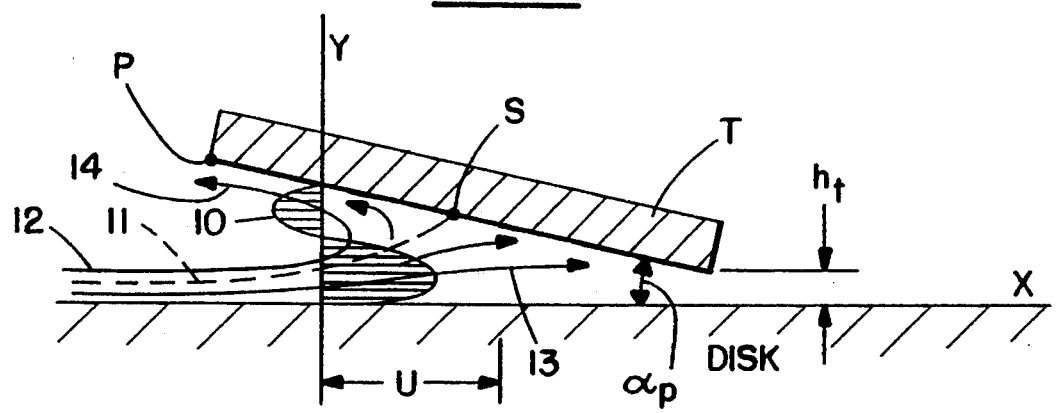
FIG. 2 is the view of FIG. 1 with an air flow pattern charted thereon showing the effect of a large taper angle.

In FIG. 2, gas flow is plotted under pad T with the portion of curve 10 (called the velocity profile) to the left of the y axis indicating a quantum of air that is regurgitated from beneath pad T. The portion of curve 10 that is to the right of the y axis indicates the portion of incoming air that proceeds beneath pad T. In the forthcoming analysis, the effects of molecular slip are ignored.

An inlet air stream 12 divides, with a portion 13 passing beneath pad T and a portion 14 regurgitated from beneath pad T. Dotted line 11 indicates the dividing line between the streamlines. The dividing point S between diverging stream lines 13 and 14 is the stagnation point. Stagnation point S depends upon the operating conditions of the pad. In particular, the position of stagnation point S moves to the left with increasing disk speeds U, for a given flying height $h_t$ and a taper angle $\alpha_p$. However, it has been found that when $\alpha_p$ is equal to or less than an $\alpha_p^*$ value (the inlet throttle angle value), stagnation point S moves quickly towards leading edge inlet point P as disk speed U increases. This fact is responsible for the fast take-off behavior of sliders constructed in accord with the invention. However, if $\alpha_p$ is greater than $\alpha_p^*$, stagnation point S moves slowly to the left towards P. For commonly used disk speeds, i.e., where U is less than 50 meters per second, or in small 3.5 inch disk files, where U is about 10 meters per second, stagnation point S does not reach inlet point P within the normal speed ranges of the disk file. More particularly, at the normal speed ranges of such disk files, the stagnation point S wanders with speed because $\alpha_p > \alpha_p^*$.

Figure 3:
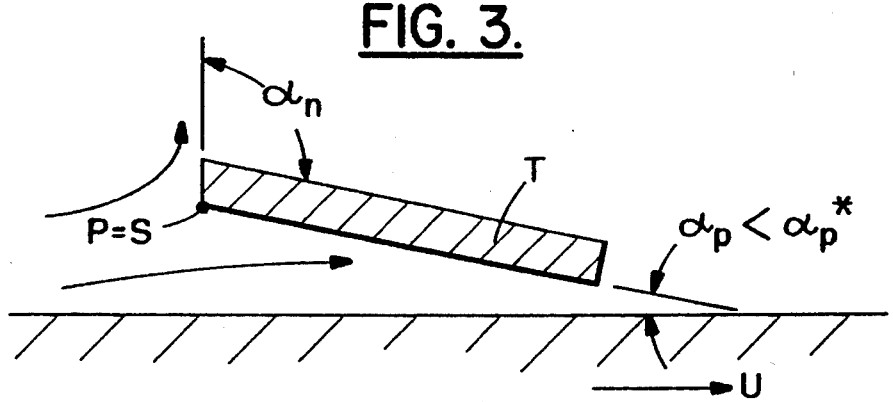
FIG. 3 is the view of FIG. 1 when the taper angle causes a pad to be "inlet-throttled".

A principle feature of air bearing sliders that incorporate the invention is to cause the location of stagnation point S to remain at inlet point P as much as possible so as to assure a constant amount of entrained air beneath pad T. When stagnation point S is "pinned" at inlet point P, pad T is defined as being "inlet throttled". Under such a condition, there is no reverse flow of air from pad T (e.g., see FIG. 3). Pinning of stagnation point S at inlet point P occurs most easily when the radius of curvature at point P is made as small as possible (e.g. as sharp as possible). In addition, the leading edge 14 of pad T should preferably have an angle $\alpha_n$ as small as possible, however, for reasons of manufacturability, $\alpha_n$ is generally 90 degrees or more.

To provide a criterion for selection of inlet throttle angle $\alpha_p^*$, the bearing number of the pad is defined as follows (see W. A. Gross, "Fluid Film Lubrication"; John Wiley, 1980):

$$\text{Bearing Number} = \Lambda = \frac{6\mu UL}{P_a h_t^2} \quad (1)$$

where:
$\mu$ = dynamic gas viscosity
U = disk speed
$P_a$ = ancient pressure
$h_t$ = trailing edge gap It is known from the theory of self-acting air bearings that as the bearing number approaches infinity (for example, when a disk speed becomes very large or the gap $h_t$ is very small, or both), the limiting form of Reynolds' equation is:

$$ph = C_1 = P_a h_i \quad (2)$$

where:
p = gas film pressure
h = gas film gap
$C_1$ = constant depending only on inlet conditions.
$h_i$ = inlet gap The velocity u of the gas flow can be written as:

$$u = U\left(1 - \frac{y}{h}\right) + \frac{1}{2\mu}\left(\frac{dp}{dx}\right)(y^2 - yh) \quad (3)$$

where:

$$\frac{dp}{dx}$$

is the pressure gradient of the gas flow.

y = coordinate orthogonal to recording surface

FIG. 2 shows a particular instance of the velocity profile given by equation 3.

If $\delta u/\delta y = 0$ anywhere within the gas film when $y = h$, then S is located somewhere within the length L of pad T.

There is a characteristic condition at which S starts to deviate from P that happens when:

$$\frac{\partial u}{\partial y}\bigg|_{y=h} = 0. \quad (4)$$

To keep S at P, it is required that $$\frac{h^2}{2\mu U} \frac{dp}{dx} \leq 1 \quad (5)$$

be valid for any $\Lambda$.

The asymptotic expression (2) is now used in combination with expression (4) to derive an expression for inlet throttle pad angle $\alpha_p^*$.

For the tilted pad T, at characteristic conditions:

$$\frac{dh}{dx} = -\alpha_p^* \quad (6)$$

Thus, using expression (2)

$$p = \frac{P_a h_i}{h} \quad (7)$$

$$\frac{dp}{dx} = -\frac{P_a h_i}{h^2} \frac{dh}{dx}$$

$$\frac{dp}{dx} = \frac{P_a h_i}{h^2} \alpha_p^* \quad (8)$$

Inserting $$h^2 \frac{dp}{dx}$$

into equation (4)

$$P_a h_i \alpha_p^* \leq 2\mu U \quad (9)$$

$$\alpha_p^* \leq \frac{2\mu U}{P_a h_i}$$

If the gap profile of an inlet throttled pad is not a straight taper as in the case just presented, analogous arguments apply. For example if the profile is that of a stepped bearing, the condition on $\alpha_p^*$ becomes a condition on the step height.

Expression (9) may now be used as a guide in choosing a pad taper angle that will enable inlet throttling to occur beneath an air bearing slider.

As an example, assume the following values:
$\mu = (18)(10^6)$ Nsec/m²
U = 1 m/sec
$h_i$ = 300 nm
$P_a = 10^5$ N/m²

To assure that there is no reverse flow at U=b 1 m/sec, expression 9 indicates that $\alpha_p^*$ is approximately 1.3 milliradians. At higher disk speeds experienced with modern disk drives, typical pad angles will be chosen in the range of 100–500 microradians. The practical lower limit on $\alpha_p$ is set by the air bearing slider and disk flatness characteristics. The flatter the air bearing slider and the disk are, the smaller $\alpha_p$ can be—but under no circumstance must the pad angle be negated by the waviness of the disk.

Figure 4:
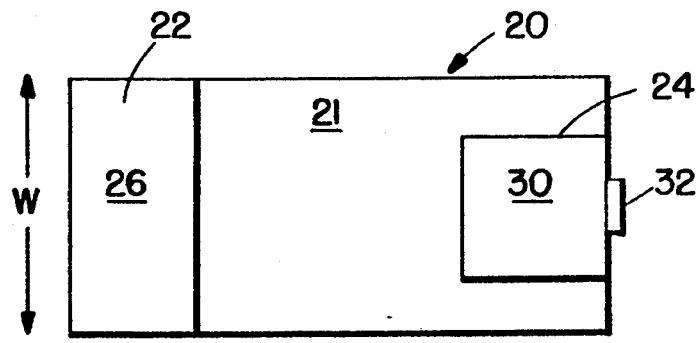
FIG. 4 is a plan view of a bearing side of an inlet-throttled air bearing slider constructed in accordance with the invention.
Figure 5:
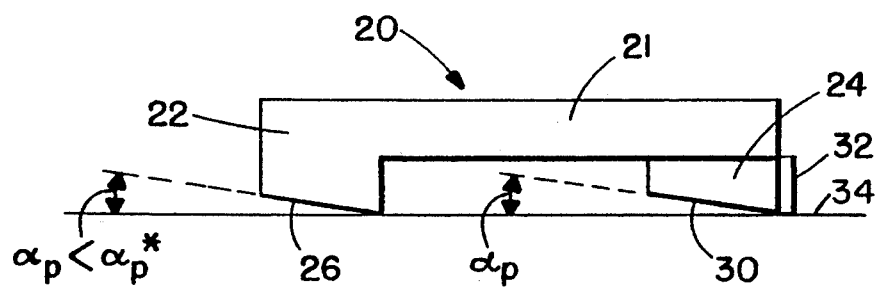
FIG. 5 is a side view of the air bearing slider of FIG. 4, when at rest on a disk surface.
Figure 6:
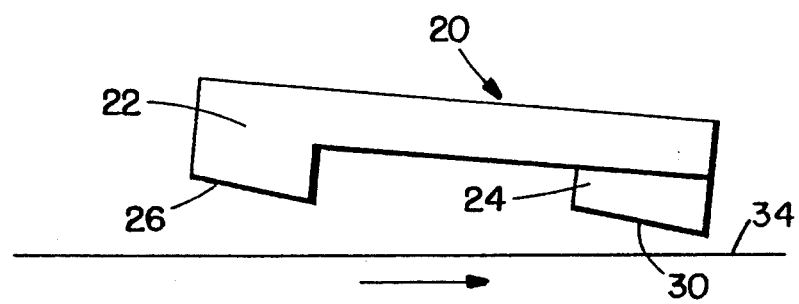
FIG. 6 is a side view of the air bearing slider of FIG. 4, when the disk surface is at operating speed.

Turning to FIGS. 4–6, an air bearing slider 20 is shown that includes pads having taper angles that enable inlet throttle effects to be exhibited by slider 20. Furthermore, the longitudinal separation distance between pads on air bearing slider 20 is selected to be large enough to prevent itch instability. Air bearing slider 20 comprises a main body portion 21 having leading and trailing, downwardly depending pads 22 and 24. Pad 22 has a bearing surface 26 whose angle is inclined with respect a disk surface 34 at an angle $\alpha_p \leq \alpha_p^*$. Similarly, bearing surface 30 of pad 24 also exhibits a similar taper angle $\alpha_p$. A magnetic head 32 is attached to the trailing edge of pad 24 in the known manner.

In FIG. 5, air bearing slider 20 is at rest on disk surface 34. Due to the line contact between the bearing surfaces of pads 22 and 24 and disk surface 34, air bearing slider 20 exhibits low stiction when disk surface 34 begins to move. As shown in FIG. 6, when disk surface 34 is up to speed, air bearing slider 20 elevates to a flying height that is determined by the amount of gas entering between pad surfaces 26 and 30 and disk surface 34.

Pads 22 and 24 are separated by a longitudinal distance d. Perturbation of either pad 22 or 24 thus causes mostly a gap change with hardly any pitch angle change to air bearing slider 20. Thus, pads 22 and 24 are "coupled" and enable air bearing slider 20 to exhibit substantial pitch stability. More specifically, gap changes in any pad overwhelms a destabilizing effect of a pitch angle change. It is required however that pads 22 and 24 be sufficiently distant from each other so as to enable this coupling effect to occur. It is preferred that distance d be approximately half the length of air bearing slider 20, but such distance is an approximation and those skilled in the art may vary it within a wide range. For instance, if air bearing slider 20 is approximately 2.5 millimeters in length, distance d is approximately 1.25 millimeters.

While it is preferred that pads 22 and 24 extend across the entire width W of air bearing slider 20, a channel or channels parallel to the longitudinal axis of air bearing slider 20 may be provided for increased roll stiffness. In such case, the areas of bearing surfaces 28 and 30 must still occupy a substantial portion of width W of the air bearing slider—so as to avoid rail-like effects.

The slider according to the current invention is also resistive to crown variations. A positive crown (slider convex toward the disk) causes an increase of the front pad angle and an equal and opposite decrease of the rear pad angle. If the front pad angle increase occurred by itself, the rear of the slider would lift up. A decrease of pad angle at the rear pad would cause a decrease of the fly height at the rear of the slider. When the two aforesaid isolated effects occur simultaneously, as is the case when crown occurs, the fly height of the rear of the slider (trailing edge of rear pad) remains essentially unchanged. Thus, unwanted crown effects, for example those caused by disk drive warm-up and cool-down, are much less deleterious.

Figure 7:
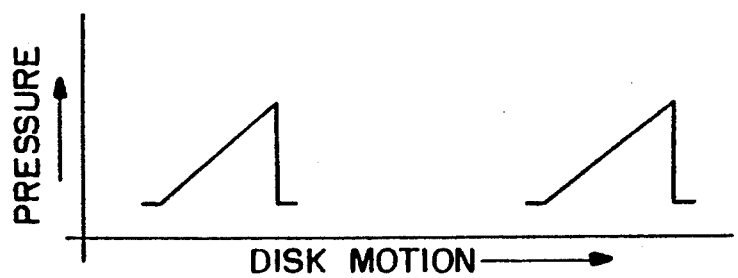
FIG. 7 is a plot of pressure versus location on the pads of the air bearing slider of FIG. 6.

From an examination of the plot of FIG. 7, it can be seen that the distribution of pressure on surfaces of pads 22 and 24 is asymmetrical (i.e. slanted "rearward") with respect to the center of each pad. Therefore, if the load on a symmetric air bearing slider with equal size front and rear pads, was applied to the center of air bearings slider 20, the slider would pitch down because the pitch moment of rear pad 24 would be larger than the pitch-up moment of pad 22 (due to the larger distance from the center of pressure on rear pad 24 to the center of slider 20). This may be obviated by placing the slider suspension off center. However, since it is preferred to put the suspension pivot exactly in the center of the slider to prevent unwanted slider yawing, the width of rear pad 24 is decreased by approximately 25%. This reduction prevents a pitch-down moment from occurring. By adjusting the ratio of widths of front and rear pads 22 and 24, the fly height versus speed behavior of air bearing slider 20 can be manipulated. For example, a slender front pad 22 and a stubby rear pad 24 would lead to an air bearing slider with a fly height that ultimately would decrease with speed, because the rear pad would reach an inlet throttled condition at a higher speed than the front pad.

Figure 8:
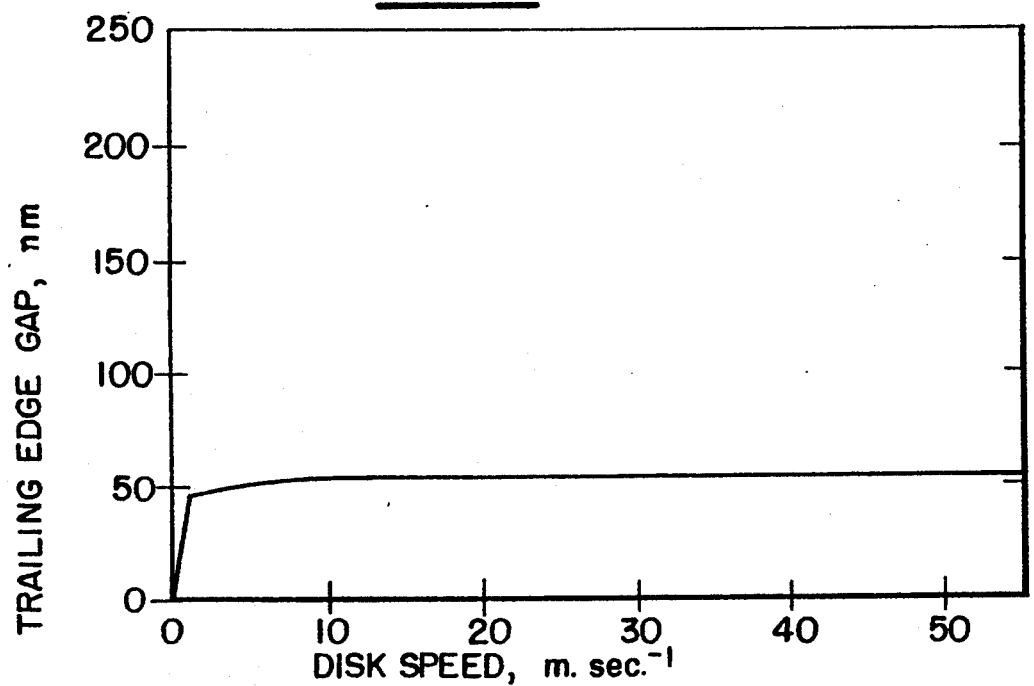
FIG. 8 is a plot of changes in the trailing edge gap for the air bearing slider of FIG. 6, with changes in disk surface speed.

FIG. 8 is a plot of the trailing edge gap of an air bearing slider, constructed as shown in FIGS. 4–6 as plotted against disk speed surface in meters per second. With taper angles on pads 22 and 24 arranged to assure inlet throttling, it can be seen that the air bearing slider exhibits a very rapid take-off and a stable gap with disk surface velocity changes.

Figure 9:
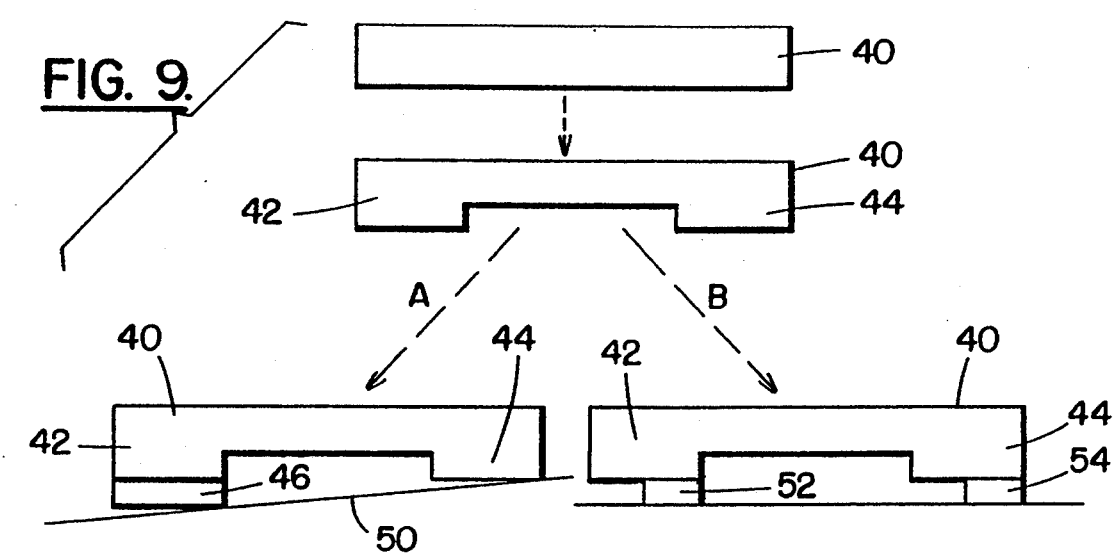
FIG. 9 is a schematic drawing of a method of manufacture of two types of air bearing sliders that exhibit inlet-throttle characteristics.

Referring to FIG. 9, a method for producing an air bearing slider using planar processing techniques is illustrated. A slider body 40 is initially processed to provide front and rear pads 42 and 44, for example, by diamond wheel cutting or by reactive ion etching of the space therebetween. The etch depth must be sufficient to cause the space between pads 42 and 44 to have negligible effect on the fly height of the slider. The procedure then can take the form of directions A or B. Along direction A, a thin wear film 46 is deposited on the lowermost surface of pad 42 so that when air bearing slider 40 rests on a disk surface 50, the proper taper angles occur on pads 42 and 44. Note that the required taper angles result from changes of elevation of pads 42 and 44 and not from angular adjustment of one pad plane relative to another pad plane.

By adjusting the thickness of wear film 46, the taper angle can be similarly adjusted. A typical thickness of wear layer 46 is 5000 Angstroms (for a 2.5'1.6 mm slider). Deposited film 46 must be able to stand up to wear. Thus, materials such as hydrogenated carbon, silicon carbide, aluminum oxide or ruthenium oxide are acceptable. In addition to film 46 on pad 42, a wear layer may also be deposited on pad 44 with its height being adjusted in relation to layer 46 so as to assure a proper taper angle.

If the procedure follows direction B, the taper angle can be approximated by depositing wear layers 52 and 54 on the lowermost surfaces of both pads 42 and 44. By adjusting the set back of the front edges of wear layers 52 and 54, an approximation of a desired taper angle can be achieved. Thus the step height plays the role of the taper angle and the height is adjusted to provide inlet throttling.

Figure 10:
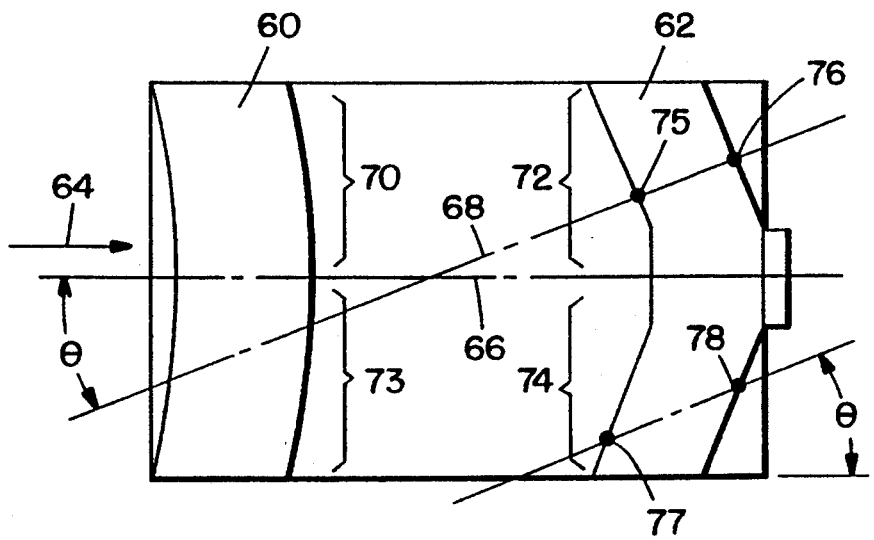
FIG. 10 is a preferred embodiment of an inlet throttled air bearing slider which exhibits a uniform flying height, even under large skew conditions.
Figure 11:
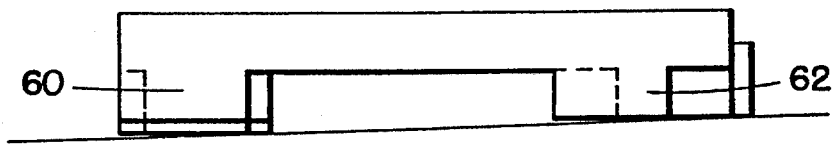
FIG. 11 is a side view of the air bearing slider of FIG. 10.

Referring now to FIGS. 10, 11, arid 12, an inlet throttled air bearing slider is illustrated that exhibits improved fly-height/speed characteristics. While an inlet throttled taper angle design with spaced-apart pads largely overcomes fly height variations resulting from disk velocity changes, skew angle variation and the curvature of the disk velocity field still can cause fly height variations of the above described air bearing slider configurations.

In FIG. 10, both front and rear pads 60 and 62 are provided with swept-forward pad arrangements. In specific, pads 60 and 62 exhibit convex boundaries that face in the direction of disk motion 64. The angle $\theta$ between center line 66 and 68 is the skew angle $\theta$. As skew angle $\theta$ increases, arms 70 and 72 produce pressures that are lower than the pressures on arms 73 and 74, respectively. The reason for this is that arms 73 and 74 are more closely aligned to disk velocity axis 68 than are arms 70 and 72. The pressures developed by arms 73 and 74 are larger than those in 70 and 72 because they stem from larger inlet gaps. For example, points 76 and 78 located symmetrically with respect to the slider centerline (but just inside the trailing edge), produce pressures determined by the inlet gaps at 75 and 77, respectively. Since the gap at 77 is larger than that at 75, the pressure at 78 (by equation (2)) is larger than that at 76. Due to the symmetry of pads 60 and 62 about center line 66, skew angle $\theta$ may vary in either direction about centerline 66 and the respective arms of pads 60 and 62 accomplish the aforesaid fly height compensation against skew. If resistance against one-sided skew is desired, the forward sweep (convexity) may be applied to one side of the slider only.

Figure 12:
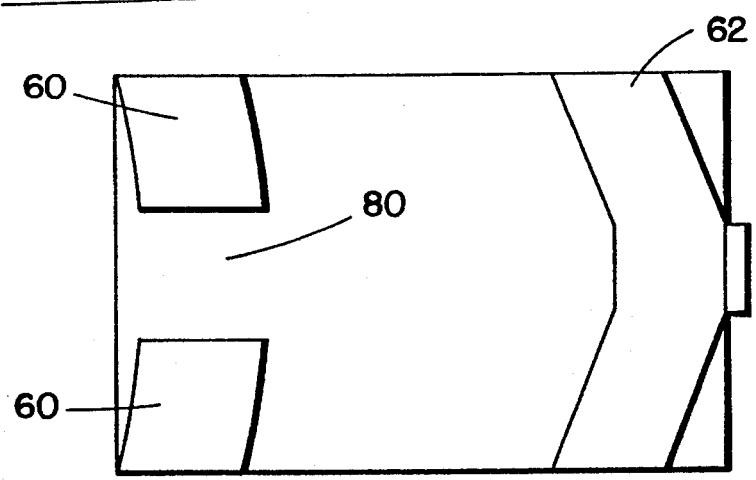
FIG. 12 is a plan view of a modified air bearing slider with dual front pads to enhance roll stiffness.

In FIG. 12 a version is shown of the air bearing slider of FIGS. 10 and 11, wherein pad 60 is provided with a channel 80 that interrupts the continuous convex shape of pad 60. By a concentration of pad areas towards the sides of the air bearing slider, roll stiffness of the slider is increased at the expense of speed/spacing uniformity.

Figure 13:
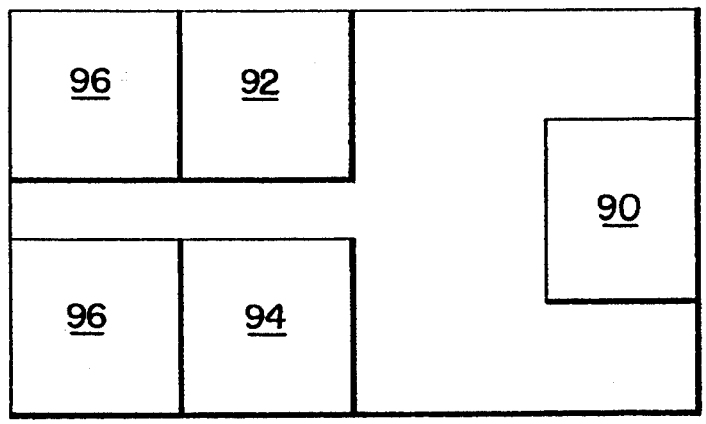
FIG. 13 is a plan view of an inlet throttled air bearing slider that exhibits self-loading characteristics.
Figure 14:
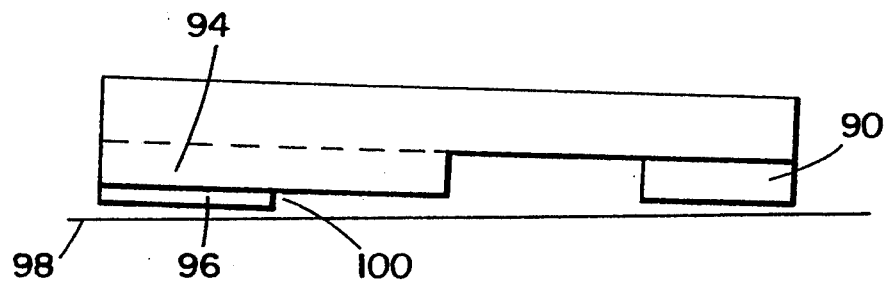
FIG. 14 is a side view of the air bearing slider of FIG. 13.

In FIGS. 13 and 14 a self-loading embodiment of the invention is illustrated. There, the air bearing slider is provided with rear pad 90 and front pads 92 and 94. Front pads 92 and 94 have a wear layer 96 thereon which covers only the forward portion of the bearing faces of front pads 92, 94. As a result, when the air bearing slider flies over disk surface 98, an area 100 of subambient pressure develops behind layer 96. This causes a self loading action that tends to maintain the air bearing slider in proximity to disk surface 98. Without the subambient pressure at area 100, the slider must be loaded with a heavier force for a given normal stiffness. As with the slider version shown in FIGS. 10 and 11, the provision of a channel between front pads 92 and 94 provides for added roll stiffness.

Figure 15:
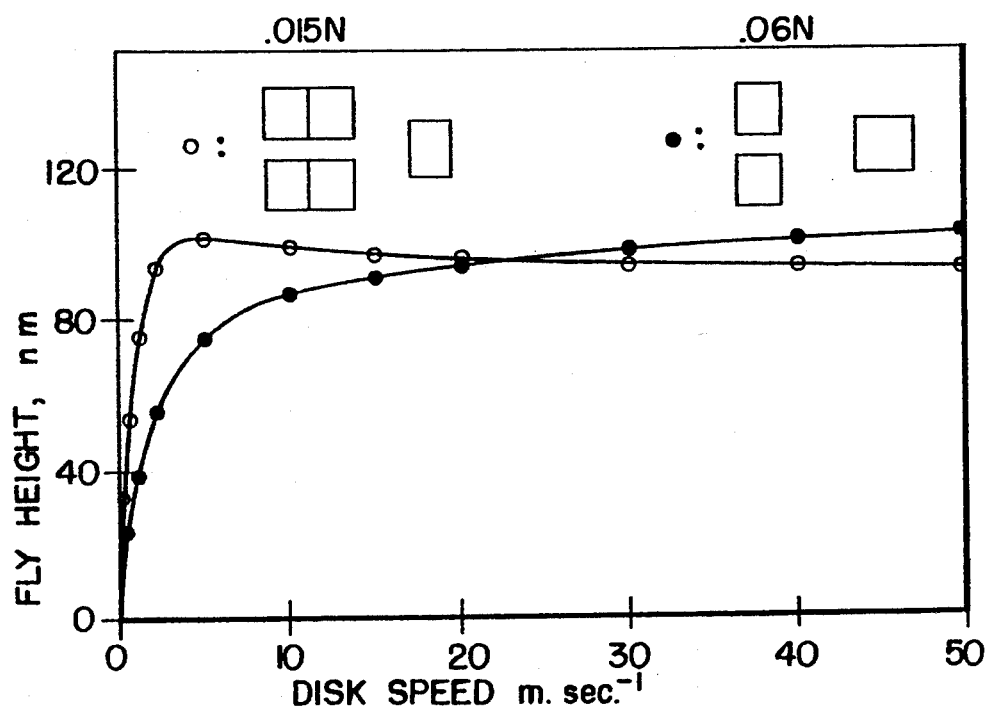
FIG. 15 is a plot of fly height versus disk speed of the air bearing sliders that are both self-loading and non-self loading.

FIG. 15 indicates a plot of fly height for two slider configurations, one with and another without layer 96 for subambient pressure development. The slider at the left of FIG. 15 corresponds to that shown in FIGS. 13 and 14. It is to be noted that the performance of the slider illustrated in FIGS. 13 and 14 exhibits a more rapid take-off and a latter fly height versus speed characteristic than one without the subambient pressure provision.

While all the embodiments of the invention described above are very useful with non-lubricated disks or disks having so-called "solid" lubrication layers, it will be recognized that the possibility exists that if these geometries are used with disks having liquid lubrication layers, a buildup of lubricant and particles may occur which will eventually be detrimental to operation of the magnetic recording system. The potential for this type of occurrence is more significant with respect to those sliders having at least one pad with a continuous forward sweep across the width of the slider (such as a complete V-shape), as those represented by FIG. 10 and FIG. 12.

The sliders of these figures, while having generally adequate stability, do not have extremely high roll stiffness. This can, under certain circumstances, degrade the dynamic performance of the slider. Further, the sensitivity to load is a bit higher than may be desired and the front pad fly height has a relatively high sensitivity to crown.

Figure 16:
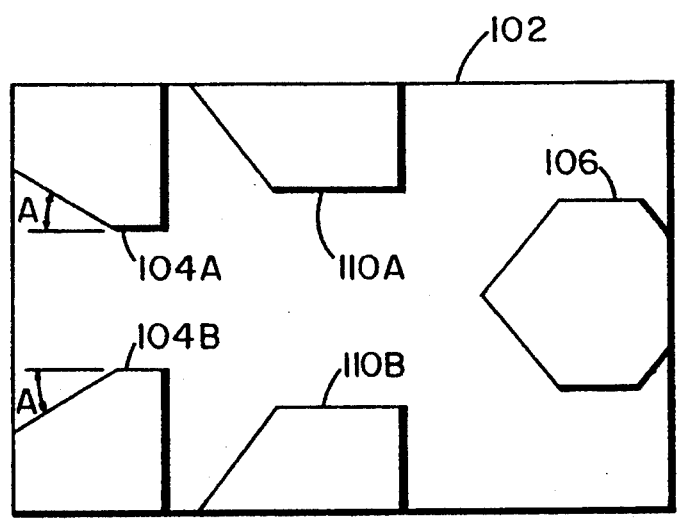
FIG. 16 is a plan view of an inlet throttled air bearing slider particularly useful with a lubricated disk.
Figure 17:
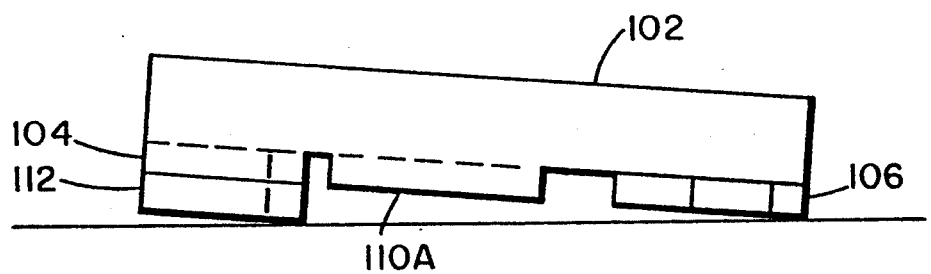
FIG. 17 is a side view of the air bearing slider of FIG. 16.

The slider of FIG. 16 and FIG. 17 is an improvement which deals with these issues, while maintaining to a large degree the advantageous features of the embodiments described above. In slider 102 instead of using a single front pad, two front pads 104A and 104B are provided. The design is less sensitive to wall angles produced by reactive ion etching. Further, the front to back flow through the air bearing surface is increased to drastically reduce the chance of debris accumulation. The chance of debris accumulation is further decreased by having the opening 104 between the pads angle outward by some angle A so that the opening is widest at the front end of the slider. The angle A also plays a role in skew insensitivity as more fully explained in co-pending application Ser. No. 08/082,205 entitled "Speed and Skew Independent, Air Bearing Slider" and filed on even date herewith.

The rear pad 106 is also reduced in width to avoid debris accumulation, as well as to insure that more tracks can be written at the outer diameter of the disk without the pad hanging over the edge of the disk, Pad 106 is tapered to a point in the forward direction. It is also tapered to a smaller lateral dimension along the rear edge of the slider.

Two additional side pads 110A and 110B are utilized to increase the roll stiffness of the air bearing surface. This improves the dynamic behavior of the slider, by providing increased roll resistance, and reduces its sensitivity to load.

Slider 102 is manufactured by reactive ion etching to produce the configuration shown in FIG. 16 and FIG. 17. To provide positive pad angles, a thin layer 112 of, for example, NiCrO followed by a thin layer of diamond-like carbon is deposited on pads 104A and 104B. The small pad angles produce quick takeoffs and low rest stiction due to the small area of contact. The step height depends on the overall slider size but its height should typically produce pad angles of approximately 300 microradians.

The surfaces of pads 110A and 110B are in the same plane as the surface of pad 106. However, due to the taper these surfaces are farther away from the disk than the front and rear pads. Thus, the middle pads produce relatively little lift. Consequently, roll stiffness may also be enhanced by locating pads 110A and 110B in a more rearward direction; that is closer to pad 106.

Figure 18:
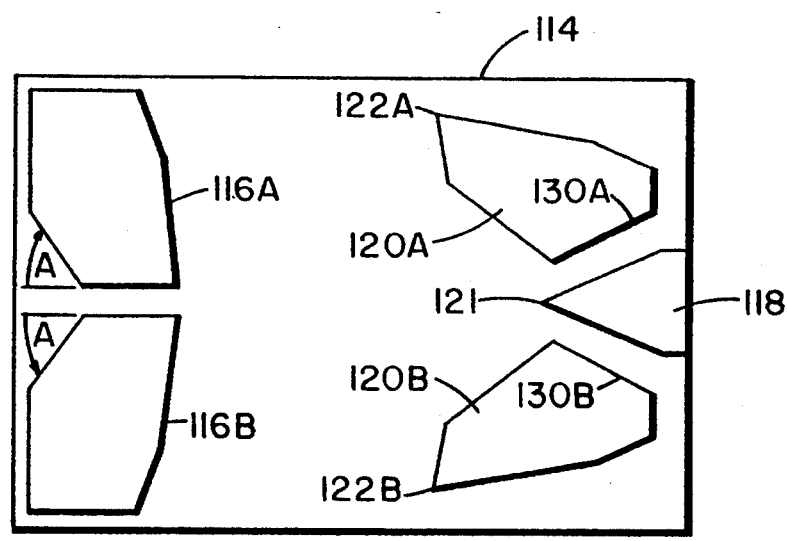
FIG. 18 is a plan view of another inlet throttled air bearing slider useful with a lubricated disk.
Figure 19:
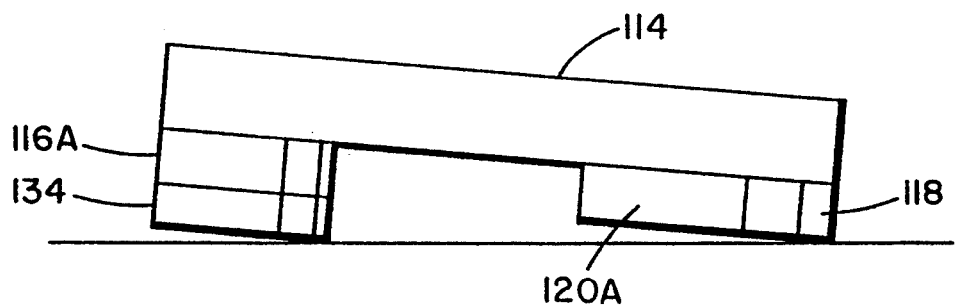
FIG. 19 is a side view of the air bearing slider of FIG. 18.

A slider having yet another configuration, which does place the side pads more rearwardly is shown in FIG. 18 and 19. In slider 114, an opening which increases in width toward the leading edge of the slider is provided between front pads 116A and 116B to discharge any lubricant that might otherwise accumulate. These front pads have trailing edges which are swept forward by a first angle at portions adjacent the opening between the pads and at a second greater angle at portions closer to the side edges of the slider. A rear pad 118 tapers to a point 121 at its leading edge. Side pads 120A and 120B have complex hexagonal shapes including trailing edges parallel to the trailing edge of slider 114, forward points 122A and 122B respectively, and forwardly swept leading and trailing edges having corners which define different forward sweep angles for different portions of the respective edge. Edges 130A and 130B, respectively, are generally parallel to the rearwardly swept leading edges which define the taper to point 121 of rear pad 118 so as to define a channel between each of pads 120A and 120B and pad 118.

The exact shapes of side pads 120A and 120B are not critical and the pad outlines need not have sharp corners.

In general sliders of the type described above may be manufactured by reactive ion etching. For example, to manufacture the slider of FIG. 18 and FIG. 19, reactive ion etching is used to produce a recess of 25 microns in depth between the pads. Rounding on pad leading edges is to be avoided. For a slider 2.5 mm long positive pad angles are achieved by depositing a layer 134 of NiCrO followed by a few hundred Angstroms of diamond-like carbon to provide a total thickness of 3850 Angstroms on pads 116A and 116B. The pad angles are approximately 300 microradians.

While reactive ion etching is entirely satisfactory for the production of slider heads, it is also fairly expensive. An alternative manufacturing technique which has been used is sawcutting using a diamond saw.

Figure 20:
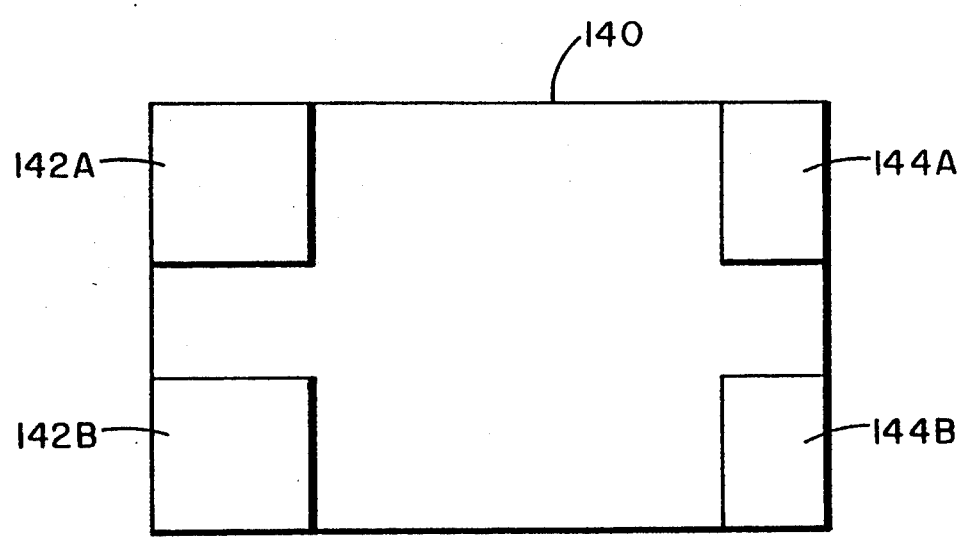
FIG. 20 is a plan view of an inlet throttled air bearing slider that can be manufactured using uninterrupted saw cuts.

FIG. 20 illustrates a four pad slider 140 which may be manufactured using uninterrupted saw cuts. Front pad 142A is wider than front pad 142B. Rear pad 144A is wider than rear pad 144B. This is done to provide the best static roll properties when the slider is at both the inner diameter and the outer diameter of disk. Specifically, at the inner diameter the roll stiffness must be greater so that the minimum fly height is as close as possible to the read/write element fly height.

The front pads have a layer of NiCrO followed by a few hundred Angstroms of hard carbon of approximately 9625 angstroms in thickness deposited thereon. This provides pad angles of 500 microradians.

Figure 21:
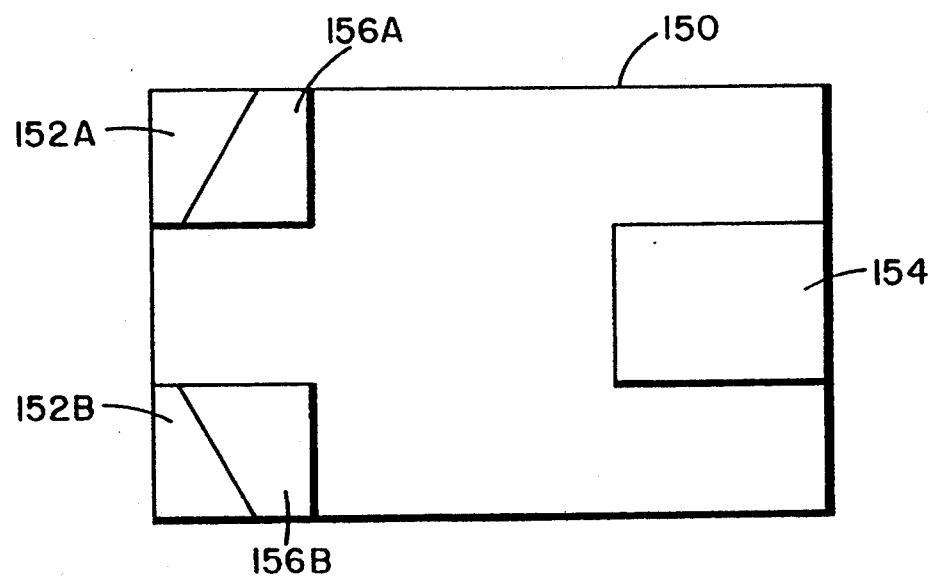
FIG. 21 is a plan view of an inlet throttled air bearing slider that may be manufactured using interrupted saw cuts.

Referring to FIG. 21 the slider 150 is manufactured with sawcuts that define the air bearing outlines without extending through the entire slider blank. In this case more complex designs are possible. The trailing edge of the air bearing can be as narrow as the write/head but some sawcuts must stop short of the front pads. Slider 150 of FIG. 21 includes front pads 152A and 152B and rear pad 154. However, pads 152A and 152B each contain a step area 156A and 156B respectively, which has a backward sweep and covers only the rear part of the front pads. The steps are created with a deposition of 6254 Angstroms of NiCrO followed by a few hundred Angstroms of hard carbon. On areas 156A and 156B the pad angles of this design are 325 microradians.

The design of FIG. 21 has the advantage in that the angled step on the front bearing pads provides more skew insensitivity than that of the design shown in FIG. 20. Care must be taken during deposition to avoid the formation of a ridge or "fence" at the step boundary.

It will be understood by one skilled in the art, that the lower limit on pad angle is determined by the waviness of the disk along the circumferential direction. For example, with present disk technology, this is on the order of fifty microradians. It is necessary that the pad angle be significantly larger than the maximum slope of the disk surface, thus requiring a pad angle of at least 100 microradians at the present time. In addition, present surface roughness constraints require a large angle to produce a resulting fly height which is larger than the height of asperities on the disk. As disk technology improves, smaller pad angles may be appropriate.

In summary, by using small pad angles which result in inlet throttling, the present invention unexpectedly results in a slider which takes off at a very low speed. This is contrary to the general (aeronautical) understanding that a larger angle results in a fast take off.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An air bearing slider for supporting a transducer over a moving recording surface, said air-bearing slider comprising:
   a slider body having a major surface opposed to said recording surface, said slider body also having leading and trailing edges oriented along a direction of motion of said recording surface;
   front pad means depending from said major surface and substantially adjacent said leading edge of said slider body and having a leading edge substantially transverse to said direction of motion of said recording surface, said front pad means exhibiting a contact face opposed to said recording surface;
   rear pad means depending from said major surface and substantially adjacent said trailing edge of said slider body and having a leading edge, said rear pad means exhibiting a contact face opposed to said recording surface, said leading edge of said rear pad means separated from a trailing edge of said front pad means by a distance that is substantially greater than a fly height of said air bearing slider, both contact faces of said front pad means and rear pad means, when positioned on a plane of said recording surface, exhibiting effective taper angles which cause each said front pad means and rear pad means to exhibit stagnation lines that are substantially co-located with leading edges of said contact faces when said moving recording surface is at operating speed, a stagnation line defining a boundary below which air is substantially entrained beneath a contact face, whereby an inlet throttling effect occurs at both said pad means.

2. The air bearing slider as recited in claim 1, wherein said taper angles of said front pad means and rear pad means do not exceed approximately one milliradian.

3. The air bearing slider as recited in claim 2, wherein said taper angles of said front pad means and rear pad means are in a range of approximately 100 to 500 microradians.

4. The air bearing slider as recited in claim 1, wherein said faces of said front pad means and rear pad means have different surface areas.

5. The air bearing slider as recited in claim 4, wherein said face of said rear pad means has a surface area that is less than the surface area of said face of said front pad means.

6. The air bearing slider as recited in claim 5, wherein said surface area of said face of said rear pad means has a surface area that is approximately 75% of the surface area of said face of said front pad means.

7. The air bearing slider as recited in claim 1, wherein said faces of said front pad means and rear pad means are parallel, said front pad means further having a layer of bearing material resident thereon, said front pad means thus being non-coplanar with said rear pad means.

8. The air bearing slider as recited in claim 7 wherein said front pad means and rear pad means each have bearing material layers resident on their respected faces, said bearing material resident on said front pad means exhibiting a greater thickness than said bearing material resident on said rear pad means, thereby rendering said front pad means and rear pad means non-co-planar.

9. The air bearing slider as recited in claim 7 wherein both said front pad means and rear pad means have bearing material layers resident on said faces thereof, said bearing material resident only on lagging portions of said faces.

10. The air bearing slider as recited in claim 7, wherein said layer of bearing material resident on said front pad means only covers a frontal portion of said face of said front pad means, a terminating edge of said layer in combination with an exposed portion of said face of said front pad means providing an area for development of a sub-ambient pressure to load said air bearing slider when in flight over a moving recording surface.

11. The air bearing slider as recited in claim 1 wherein said distance between said leading edge of said rear pad means and said-trailing edge of said front pad means is approximately one half of a longitudinal length of said slider body along said direction of motion of said recording surface.

12. The air bearing slider as recited in claim 1, which is symmetrical about a center line, and wherein at least said front pad means or rear pad means exhibits a convex curvature of its leading and trailing edges, said convex curvature being symmetrical with respect to said center line and oriented in a direction of movement of said recording surface in relation to said air bearing slider.

13. The air bearing slider as recited in claim 12 wherein both said front pad means and rear pad means exhibit said convex curvature of leading arid trailing edges.

14. The air bearing slider as recited in claim 1 wherein at least a portion of said front pad means or rear pad means exhibits a convex curvature of its leading and trailing edges, said convex curvature oriented in a direction of movement of said recording surface in relation to said air bearing slider.

15. The air bearing slider as recited in claim 1 wherein said taper angles $\alpha_p$ of said faces of said front pad means and rear pad means are both less than $\alpha_p^*$, where $$\alpha_p^* \leq \frac{2\mu U}{P_a h_i}$$

$\mu$ = dynamic gas viscosity
$U$ = disk speed
$p_a$ = ambient pressure
$h_i$ = inlet gap 16. The air bearing slider as recited in claim 15 wherein a channel is formed in said front pad means to provide added roll stability for said air bearing slider.

17. The air bearing slider as recited in claim 1 further comprising:
  side pad means disposed between said front pad means and said rear pad means for increasing roll stiffness of said slider.

18. The air bearing slider as recited in claim 1, wherein said front pad means includes a first front pad and a second front pad, said first front pad and said second front pad being shaped and positioned so as to define a channel between said first front pad and said second front pad.

19. The air bearing slider as recited in claim 18, wherein said rear pad means includes a single rear pad, said rear pad having a surface which tapers to a point in a direction toward the leading edge of said slider.

20. The air bearing slider as recited in claim 19, wherein said rear pad has a width less than that of said slider.

21. The air bearing slider as recited in claim 20, wherein said face of said rear pad is hexagonal in shape.

22. The air bearing slider as recited in claim 18 further comprising:
  side pad means disposed between said front pad means and said rear pad means for increasing roll stiffness of said slider.

23. The air bearing slider recited in claim 22, wherein said side pad means comprises a first side pad and a second side pad, said first side pad and said second side pad being shaped and positioned so as to define a channel between said first side pad and said second side pad.

24. The air bearing slider as recited in claim 23, wherein said first side pad and said second side pad have faces which taper to a point in a direction towards the leading edge of said slider.

25. The air bearing slider as recited in claim 24 wherein said face of said rear pad is pentagonal in shape.

26. The air bearing slider as recited in claim 24 wherein said side pads are disposed so as to be closer to said rear pads than said front pads.

27. The air bearing slider as recited in claim 26 wherein said side pads have a face which is hexagonal in shape.

28. The air bearing slider as recited in claim 1, wherein
  said front pad means includes two front pads separated by a first channel extending along the length of said slider; and
  said rear pad means includes two rear pads separated by a second channel extending along the length of said slider.

29. The air bearing slider as recited in claim 28 wherein said channels are positioned so that a first of said front pads is wider than a second of said front pads; and a first of said rear pads is wider than a second of said rear pads.

30. The air bearing slider as recited in claim 1, wherein
  said rear pad means includes a single rear pad;
  said front pad means includes two front pads sized, shaped and positioned to define a channel in the longitudinal direction of said slider between said front pads, each of said pads having a step disposed at a rear portion of the pad extending outwardly from the face of the pad.

31. The air bearing slider as recited in claim 30, wherein said step has a leading edge swept backward towards side edges of said slider.

32. An air bearing slider comprising:

front pad means and rear pad means, both extending from a generally planar body and having faces opposed to a recording medium and separated by a gap that is substantially larger than a fly height of said air bearing slider, said faces being disposed in parallel orientation but not co-planar so that when positioned on a plane of a recording medium, said front pad means and rear pad means both exhibit effective taper angles at inlets which cause each said front pad means and rear pad means to exhibit stagnation lines that are substantially co-located with leading edges of said faces when said recording medium moves at operating speed, a stagnation line defining a boundary below which air is substantially entrained beneath a face, whereby an inlet throttling effect occurs at both said pad means.

33. An air bearing slider comprising:

front pad means and rear pad means, both extending from a generally planar body, having leading edges and having faces opposed to a recording medium and separated by a gap that is substantially larger than a fly height of said air bearing slider, said faces being disposed in parallel orientation but not co-planar, said faces of said front pad means and said rear pad means each exhibiting a taper angle $\alpha_p$ at a leading edge when said air bearing slider is positioned on a plane of said recording medium, said taper angle $\alpha_p$ no greater than $\alpha_p^*$ to enable an inlet throttle action, wherein:

$$\alpha_p^* \leq \frac{2\mu U}{P_a h_i}$$

$\mu$ = dynamic gas viscosity
U = disk speed
$P_a$ = ambient pressure
$h_i$ = inlet gap, each said taper angle $\alpha_p$ causing each said front pad means and rear pad means to exhibit stagnation lines that are substantially co-located with leading edges of said faces when said recording medium moves at operating speed, a stagnation line defining a boundary below which air is substantially entrained beneath a contact face, whereby an inlet throttling effect occurs at both said pad means.

34. The air bearing slider as recited in claim 33, which is symmetrical about a center line, and wherein at least said front pad means or rear pad means exhibits a convex curvature of its leading and trailing edges, said convex curvature being symmetrical with respect to said center line and oriented in a direction of movement of a recording surface in relation to said air bearing slider.

35. The air bearing slider as recited in claim 34 wherein both said front pad means and rear pad means exhibit said convex curvature of leading and trailing edges.

36. Apparatus comprising:

a rotatable magnetic disk recording surface;

a slider body having a major surface opposed to said magnetic recording surface, said slider body also having leading and trailing edges oriented along a direction of motion of said magnetic recording surface;

a transducer attached to said slider body adjacent said trailing edge;

front pad means depending from said major surface of said slider body and substantially adjacent said leading edge of said slider body and having a leading edge substantially transverse to said direction of motion of said recording surface, said front pad means exhibiting a contact face opposed to said recording surface;

rear pad means depending from said major surface of said slider body and substantially adjacent said trailing edge of said slider body and having a leading edge, said rear pad means exhibiting a contact face opposed to said recording surface, said leading edge of said rear pad means separated from a trailing edge of said front pad means by a distance that is substantially greater than a fly height of said air bearing slider, said contact faces of said front pad means and rear pad means, when positioned on a plane of said recording surface, exhibiting effective taper angles which cause each said front pad means and rear pad means to exhibit stagnation lines that are substantially co-located with leading edges of both said contact faces when said moving recording surface is at operating speed, a stagnation line defining a boundary below which air is substantially entrained beneath a contact face, whereby an inlet throttling effect occurs at both said pad means.

* * * * *